United States Patent
Emery

[19]

[11] Patent Number: 6,059,343
[45] Date of Patent: *May 9, 2000

[54] FOLDABLE BOTTOM WALL BEDLINER

[75] Inventor: Phillip L. Emery, Portage, Wis.

[73] Assignee: Penda Corporation, Portage, Wis.

[ * ] Notice: This patent is subject to a terminal disclaimer.

[21] Appl. No.: 09/083,495

[22] Filed: May 22, 1998

Related U.S. Application Data

[63] Continuation-in-part of application No. 08/462,622, Jun. 5, 1995, Pat. No. 5,755,481.

[51] Int. Cl.[7] .................................................. B60R 13/01
[52] U.S. Cl. ........................................ 296/39.2; 296/39.1
[58] Field of Search .................................. 296/39.1, 39.2; 105/423

[56] References Cited

U.S. PATENT DOCUMENTS

| | | |
|---|---|---|
| 4,279,439 | 7/1981 | Cantieri . |
| 4,333,678 | 6/1982 | Munoz et al. . |
| 4,575,146 | 3/1986 | Markos . |
| 4,592,583 | 6/1986 | Dresen et al. . |
| 4,750,776 | 6/1988 | Barben . |
| 4,779,752 | 10/1988 | Vallee et al. . |
| 4,890,874 | 1/1990 | Davis . |
| 4,991,899 | 2/1991 | Scott . |
| 5,207,472 | 5/1993 | Gower . |
| 5,221,119 | 6/1993 | Emery . |
| 5,755,481 | 5/1998 | Emery .............................. 296/39.2 X |
| 5,927,785 | 7/1999 | Cantrell ................................. 296/39.1 |

*Primary Examiner*—Dennis H. Pedder
*Attorney, Agent, or Firm*—Lathrop & Clark LLP

[57] ABSTRACT

Improved corner strength and water tightness are provided in a bedliner having a bottom wall that is foldable from an as-molded position to a use position along a junction line that is spaced inwardly from the side walls and the wheel well covers to avoid joints and gaps in the bedliner corners or the interface between the wheel well covers and the adjacent bedliner components. Cut-away sections in the front wall of the bedliner are spaced inward from the bedliner corners and are to be removed to convert the bedliner from the as-molded position to the use position. The resulting segments of the front wall can be connected by a joint connector to improve strength and water tightness of the front wall.

25 Claims, 8 Drawing Sheets

FOLDABLE BOTTOM WALL BEDLINER

This application is a continuation-in-part of U.S. application Ser. No. 08/462,622 filed on Jun. 5, 1995, now U.S. Pat. No. 5,755,481.

FIELD OF THE INVENTION

The invention relates generally to pick-up trucks and to non-metallic bedliners for pick-up truck cargo beds, and more particularly to thermoformed thermoplastic bedliners.

REFERENCE TO PRIOR ART

Pick-up trucks with open cargo boxes or beds enjoy widespread popularity as work and leisure related vehicles. To protect the painted metal interior surfaces of the cargo bed from scratches, dents, chips and other damage, trucks are commonly provided with rubber or plastic bedliners. Examples of plastic bedliners produced by Penda Corporation, Portage, Wis., the assignee of the present invention, are provided in U.S. Pat. Nos. 4,575,146, 4,592,983 and 5,221,119. Examples of other bedliners are provided in U.S. Pat. Nos. 4,958,876, 4,767,149, 4,047,749, 4,750,776 and 4,991,899.

A known thermoplastic bedliner construction includes a bottom wall, opposite side walls molded to the bottom wall, and a front wall molded to the bottom wall and to the side walls along integrally molded front corners to form a three-sided box. To install an under-the-rail style bedliner, the side walls of the bedliner are bent so that their upper margins fit beneath the rails of the cargo bed side walls. The bedliner side walls are then permitted to snap back into place. Because integrally molded corners interconnect the front and side walls of the bedliner, it is sometimes difficult to manipulate the liner side walls to properly position the bedliner in the cargo bed.

Commonly formed by single sheet thermoforming processes, thermoplastic bedliners present a high value per unit weight, especially when their great length and width are taken into consideration. On the other hand, the volume encompassed by a bedliner is large compared to its weight, which makes single unit shipments prohibitively expensive under most circumstances. As a result, after manufacture, bedliners are stored, warehoused, shipped, and maintained at the retailer in stacks, with a significant quantity of like bedliners nested one within another. By receiving one upwardly opening bedliner within another, the vertical height of the stacked bedliners can be minimized.

Nevertheless, the conventional bedliner has a bottom wall with two parallel substantially upright side walls which are open at the rear of the truck bed, and which are connected at the front of the bed by an upright front wall which runs perpendicular to the side walls. When multiple bedliners of this construction are nested, there can be substantial interference between adjacent bedliners and a progressive tendency toward distortion of the plastic bedliner walls as the stack grows higher.

In addition, structural features, such as boardholders for engaging load supporting and retaining structural members, and tie down access pockets, are increasingly being designed into the bedliner walls to meet customer needs and requirements. Such features create further nesting problems and interferences, resulting in both decreased nesting density and increased nesting distortions of the bedliners.

Distorted bedliner sidewalls are unsightly, and are unappealing to the consumer. In addition, the tight fit of the bedliners near the front wall-side wall juncture, makes close nesting in that region difficult, with the result that successive bedliners in a stack are displaced further and further rearward. Not only does this rearward "kick-back" extend the length, and hence the shipping volume of the stack, it also tends to move the stack center of mass rearward, detracting from the stability of the stack. Stability is a concern not only in storage, but also when the stack is lifted and moved, for example by a forklift truck.

SUMMARY OF THE INVENTION

The invention provides an improved bedliner for the cargo bed of a pick-up truck. The improved bedliner includes side walls that are pivotable over a substantial angular range from as-molded positions to positions to be assumed upon installation in the cargo bed of a pick-up truck (i.e., installed positions). In the as-molded positions the side walls exhibit substantially increased draft angles used in their formation (i.e., the side walls are oriented at substantially greater than 12 degrees from vertical). To facilitate easy installation of the improved bedliner in a cargo bed, the liner side walls can be pivoted to their installed positions (or even beyond their installed positions to fit the upper margins of the liner side walls beneath the rails of the cargo bed walls if the bedliner is an under-the-rail style liner).

By forming the improved bedliner with larger draft angles than are employed in prior art bedliner designs formation and demolding of the bedliner are improved and bedliner nestability is also improved. Also, by increasing draft, the bedliner side walls can be made to more closely conform to features of the cargo bed. In particular, due to substantially increased draft, areas of the bedliner that would have required reverse draft or undercuts in prior art bedliners are formable without those techniques or with less profound use of those techniques. The use of increased draft angles also improves draw conditions in the mold so that the "starting gauge" of the thermoplastic sheet used to form the bedliner can be reduced while still maintaining adequate thickness in all parts of the bedliner. By pivoting the side walls to narrow the substantial draft angles the foregoing advantages are achievable without sacrificing interior space in the cargo bed.

In one embodiment the improved bedliner is molded with side walls that are formed using large draft angles and that are hinged to the bottom wall along fold lines so that the side walls are pivotable from as-molded positions to substantially more upright installed positions. To finish the molded bedliner, blank or cutout sections are removed from the front corners of the bedliner and from between the wheel covers and the bottom wall of the bedliner. Removal of the cutout sections permits the side walls to be pivoted between their as-molded positions and their installed positions.

More particularly, the invention provides a bedliner including a bottom wall, a front wall integrally molded to the bottom wall and including opposite side edge portions, and opposite side walls integrally molded to the bottom wall. Each of the side walls includes a front edge portion, and each of the side walls is pivotable relative to the bottom wall between an as-molded position and an installed position. In the as-molded positions the front edge portions of the side walls are separated from the front wall, and in the installed positions the front edge portions of the side walls engage the side edge portions of the front wall.

The invention also provides a thermoplastic bedliner including a bottom wall, a front wall integrally molded to the bottom wall, and a side wall integrally molded to the bottom wall. The side wall is pivotable relative to the bottom wall between an installed position wherein the side wall overlaps the front wall, and an as-molded position wherein the side wall is separated from the front wall by a wedge-shaped gap left by removing one of the aforementioned cutout sections.

The invention further provides a method for making a bedliner. That bedliner is made by thermoforming a sheet of thermoplastic material in a conventional manner to produce an unfinished integrally molded bedliner having a bottom wall, a front wall, and opposite side walls each integrally joined to the bottom wall along a fold line. With the bedliner in an unfinished state the side walls are positioned in as-molded positions with wedge-shaped front corner cutouts being positioned between the front edge portions of the side walls and side edge portions of the front wall. The front corner cutouts facilitate use of large draft angles and are removed during finishing of the bedliner to permit the side walls to be pivoted to installed positions. If the side walls are provided with wheelwell covers, the unfinished bedliner also includes wheelwell cover cutouts between lower edge portions of the wheelwell covers and the bottom wall. Those cutouts are also removed in finishing the wheel cover seating areas or portions on which the lower edges of the wheelwell covers seat when the side walls are pivoted to their installed positions.

Another bedliner in accordance with the present invention is made of unitary vacuum formed thermoplastic material and is for use in a cargo bed of a pickup truck. This bedliner includes: a bottom wall having a central portion and a pair of side portions, each side portion integrally molded to an opposite side of the central portion and disposed at an angle to the central portion in an as-molded position; opposite side walls, each side wall integrally molded to a corresponding side portion of the bottom wall, and having an upwardly and outwardly inclined as-molded position and having a front edge portion; a wheel well cover integrally molded to each sidewall and to a corresponding side portion of the bottom wall; and a front wall having opposite side edge portions each molded integrally to a sidewall front edge portion to form a corner, and including a pair of integrally molded wedge-shaped cut-away sections each spaced inwardly from a corner and a bottom edge integrally molded to the bottom wall central and side portions.

The bedliner bottom wall side portions may each extend downward and outward from the central portion when the bedliner is in the as-molded position. The bedliner bottom wall central portion and side portions may be molded integrally together by hinge portions that enhance flexibility when converting the bedliner from the as-molded position to the installed position after the wedge-shaped cut-away sections have been removed.

The bedliner wedge-shaped cut-away sections each may include a lower corner disposed adjacent to a junction where the bottom wall side portion and the central portion meet. The bedliner preferably includes a joint connector for connecting the front wall segments after the cut-away sections are removed. The joint connector is preferably substantially H-shaped in cross-section.

The bedliner may be an over-the-rail type of bedliner including a pair of outwardly extending top rails each integrally formed to a top edge of a sidewall, so that the top rails extend outward over the top of a pickup truck's side rails when the bedliner is installed. Also when installed, the bedliner bottom wall central and side portions are folded to be co-planar.

Still another bedliner in accordance with the present invention is of unitary vacuum formed thermoplastic material for use in a cargo bed of a pickup truck, this bedliner includes: a bottom wall having a pair of side portions integrally molded together in a non-planar relationship in an as-molded position; opposite side walls, each side wall integrally molded to a corresponding side portion of the bottom wall and having an outwardly inclined as-molded position and having a front edge portion; a wheel well cover integrally molded to each sidewall and to the corresponding side portion of the bottom wall; and a front wall having opposite side edge portions each molded integrally to a sidewall front edge portion to form a corner, the front wall including an integrally molded wedge-shaped cut-away section spaced inwardly from the corners and a bottom edge integrally molded to bottom wall side portions.

The bedliner side portions preferably extend downward and outward in the as-molded position. The bedliner bottom wall side portions may be joined together by a hinge portion to enhance flexibility and conversion from the as-molded position to the installed position. The bedliner wedge-shaped cut-away section is preferably positioned to include a lower corner disposed adjacent to a junction between the side portions of the bottom wall.

This bedliner is also preferably molded so that the side portions are folded to be co-planar in the installed position.

Thus, it is an object of the present invention to provide a truck bedliner which is closely nestable in a stack with minimal or no separators.

Other features and advantages of the invention will become apparent to those skilled in the art upon review of the following detailed description, claims and drawings.

Before an embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 1:
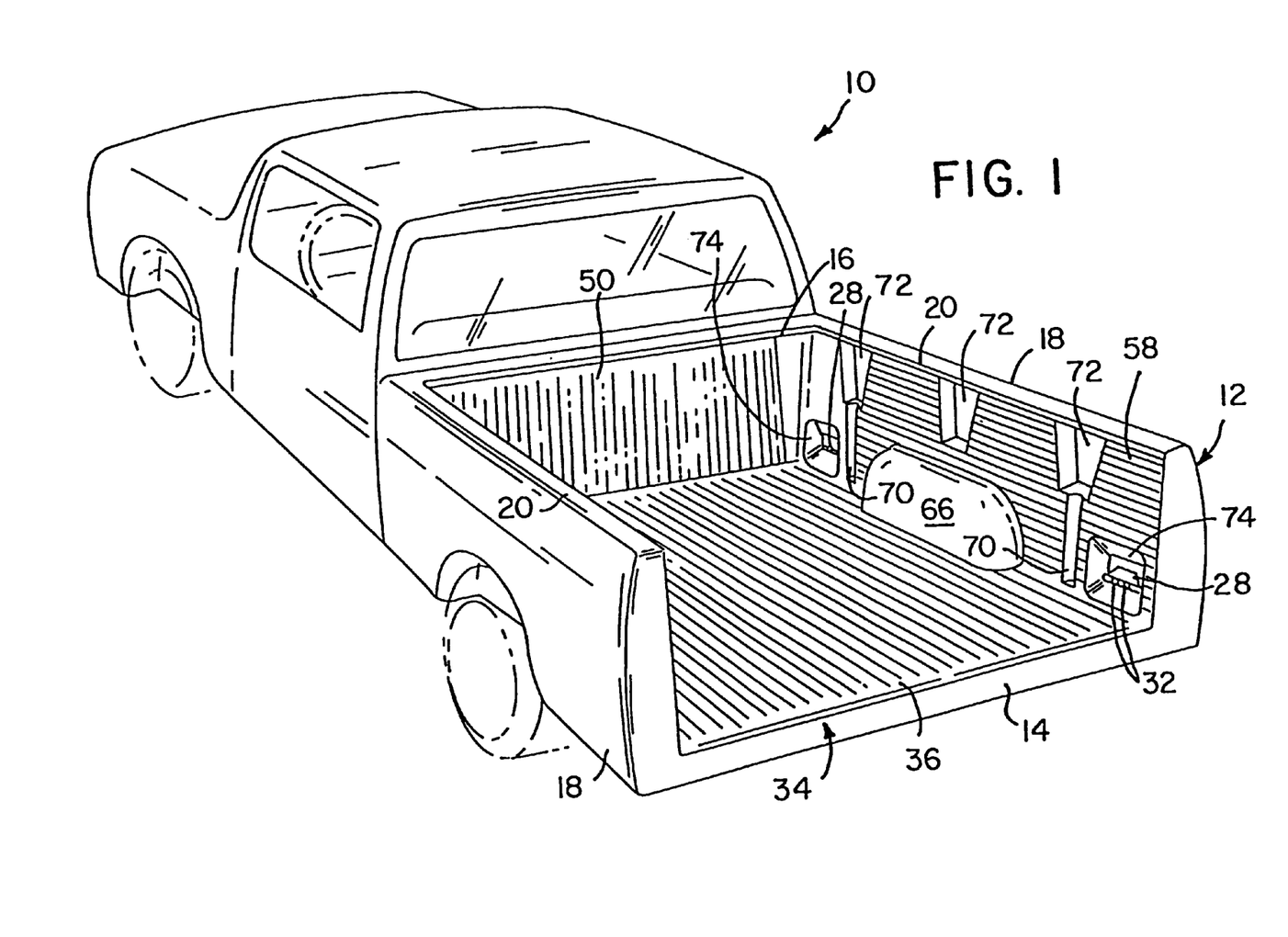
FIG. 1 is a rear perspective view of a pick-up truck including a bedliner embodying features of the invention.

Illustrated in FIG. 1 is a pick-up truck 10 including a cargo bed 12 that is shown with the tailgate removed. While the cargo bed 12 can have various configurations, as is understood by those skilled in the art, in the particular arrangement illustrated in the drawings the cargo bed 12 is (see FIG. 3) a three-sided sheet metal box structure having a generally horizontal bottom wall or floor 14, a front wall 16 and opposite side walls 18. The side walls 18 are mirror images of each other and each is provided with a rail 20 at its upper end. In the illustrated arrangement wheelwells 22 are also provided on the cargo bed 12. In other cargo bed constructions wheelwells 22 can be omitted.

Figure 3:
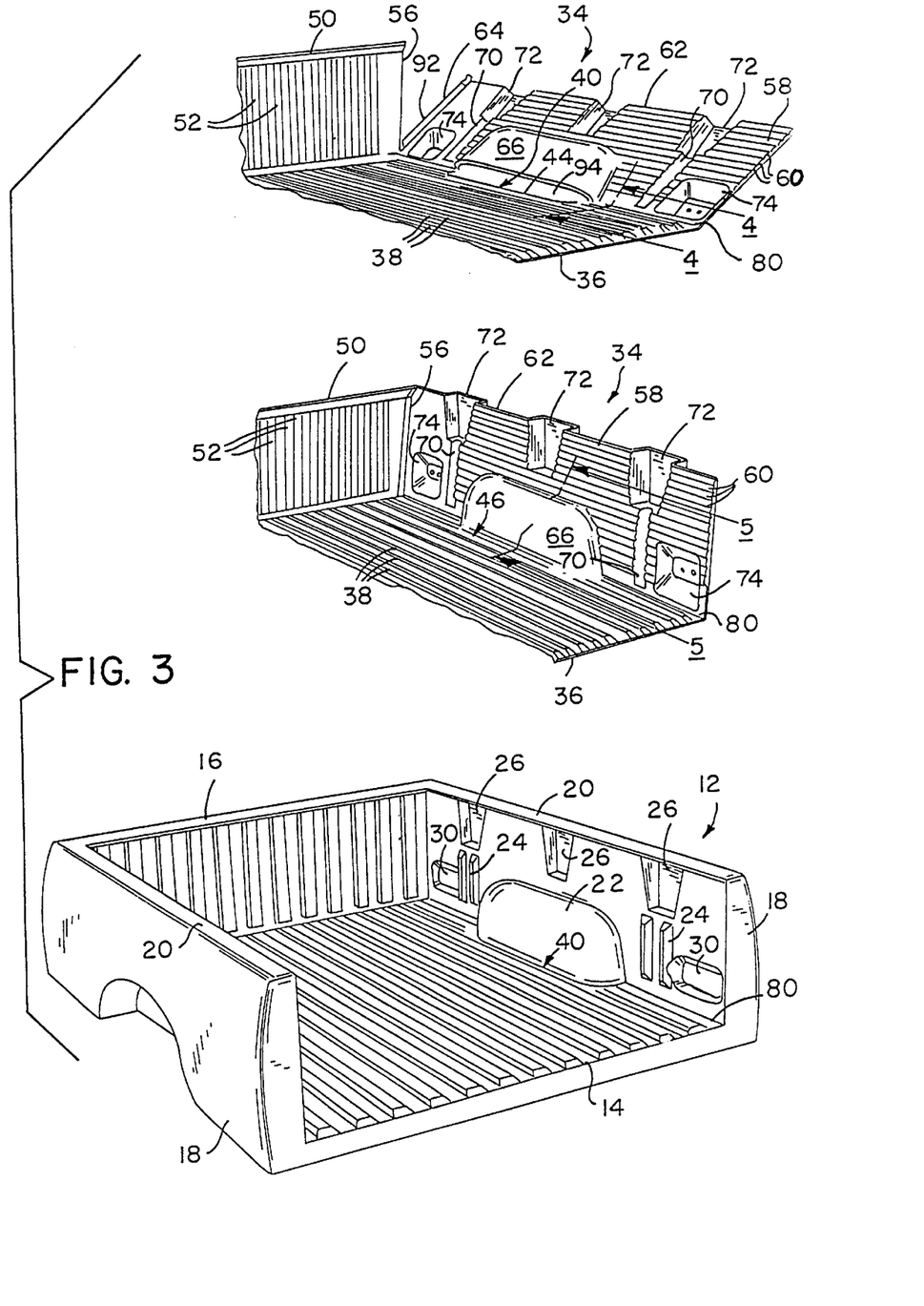
FIG. 3 is an exploded perspective view of the cargo bed and a portion of the bedliner of the pick-up truck illustrated in FIG. 1, the bedliner being shown with a side wall in as-molded and installed positions.

As shown in FIG. 3, the cargo bed 12 also includes various cargo securement and support features. Those features include vertical board restraint structures 24 and board support structures 26 on the side walls 18. In the particular embodiment illustrated in the drawings those features also include cargo securement accessories such as cleats 28 (FIG. 1) that are secured in recessed areas 30 (FIG. 3) in the side walls 18 by suitable means such as fasteners 32.

The pick-up truck 10 also includes a cargo bedliner 34 that is preferably made of a thermoplastic material such as high density polyethylene. While the bedliner 34 can have a variety of configurations without departing from the invention, in the illustrated arrangement the bedliner 34 includes a bottom wall 36 includes a bottom wall 36 that has a plurality of reinforcing ribs 38 and is sized to substantially overlie the truck bed floor 14, as shown in FIG. 1. The bottom wall 36 also includes opposite rim portions 40 (only one is shown) which are preferably mirror images of each other and which function as seating portions for wheelwell covers on the bedliner 34 as is more fully explained below. In one embodiment (see FIG. 5) each of the rim portions 40 includes an outer edge 42 that defines a generally semi-ovular opening 44, an upwardly facing seating surface 46, and a raised dam or lip portion 48 on the inside of the seating surface 46.

The bedliner 34 also includes a front wall 50 that has a plurality of reinforcing corrugations or ribs 52 and that is integrally molded to the bottom wall 36. The front wall 50 is symmetrical about a centerline 54 and includes opposite side edge portions 56 (only one is shown) that are generally vertically oriented when the bedliner 34 is mounted in the cargo bed 12.

Figure 2:
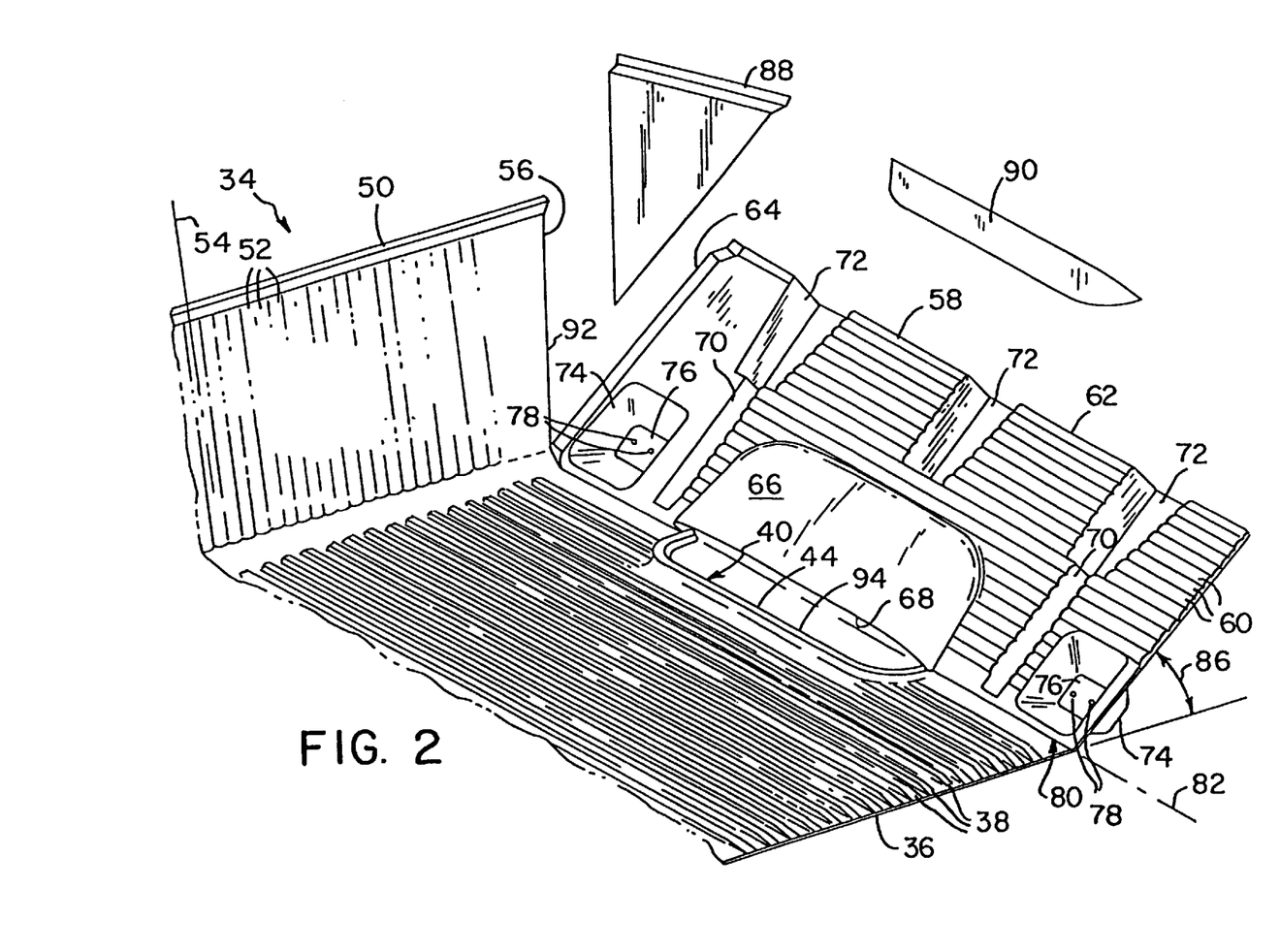
FIG. 2 is perspective view of a portion of the bedliner illustrated in FIG. 1 which is shown with cutout sections that are removed in a processing step to finish the bedliner from it's a molded state.

The bedliner 34 also includes opposite side walls 58 (only one is shown) that are mirror images of one another and that each include reinforcing corrugations or ribs 60, an upper margin 62, a front edge portion 64, a wheelwell cover 66. The wheelwell cover 66 has (FIG. 2) a lower edge portion 68 that is seatable on (FIG. 5) one of the rim portions 40. In the illustrated arrangement each of the side walls 58 is also provided with board restraint channels 70, board support pockets 72, and recessed access pockets 74. As shown in FIG. 2, the pockets 74 are provided with a base wall 76 having holes 78 for the fasteners 32.

To permit the side walls 58 to pivot relative to the bottom wall 36, each of the side walls 58 is joined to the bottom wall 36 by a hinge 80. Accordingly, the bedliner 34 is provided with means between the bottom wall 36 and each of the side walls 58 for forming the hinges 80 therebetween. While the hinges 80 can be formed in other ways and can be separated from or integrated into the molded bedliner 34, in the illustrated embodiment the side walls 58 are integrally molded to the bottom wall 36 and the hinges 80 are living hinges that each form a fold line which provides a pivot axis 82 for a corresponding one of the side walls 58.

In the particular embodiment illustrated in the drawings (FIG. 4) each of the living hinges 80 is formed by a notch 84 between the bottom wall 36 and the corresponding side wall 58. Alternatively, the living hinge 80 could be formed by other means that provide a thinned material cross-section relative to adjacent areas of the bottom wall 36 and one of the side walls 58 or by a scored line, for example.

The bedliner 34 is preferably molded as a one-piece unit using a vacuum thermoforming process such as is known to those skilled in the art. Briefly, in that process a planar thermoplastic sheet is heated and then drawn onto a thermoforming mold (not shown) to form the sheet to a desired shape. After the molded part has partially cooled it is removed from the mold and trimmed to its final configuration.

Figures 4, 5, 6, 7, 8, 9, 10, 11:
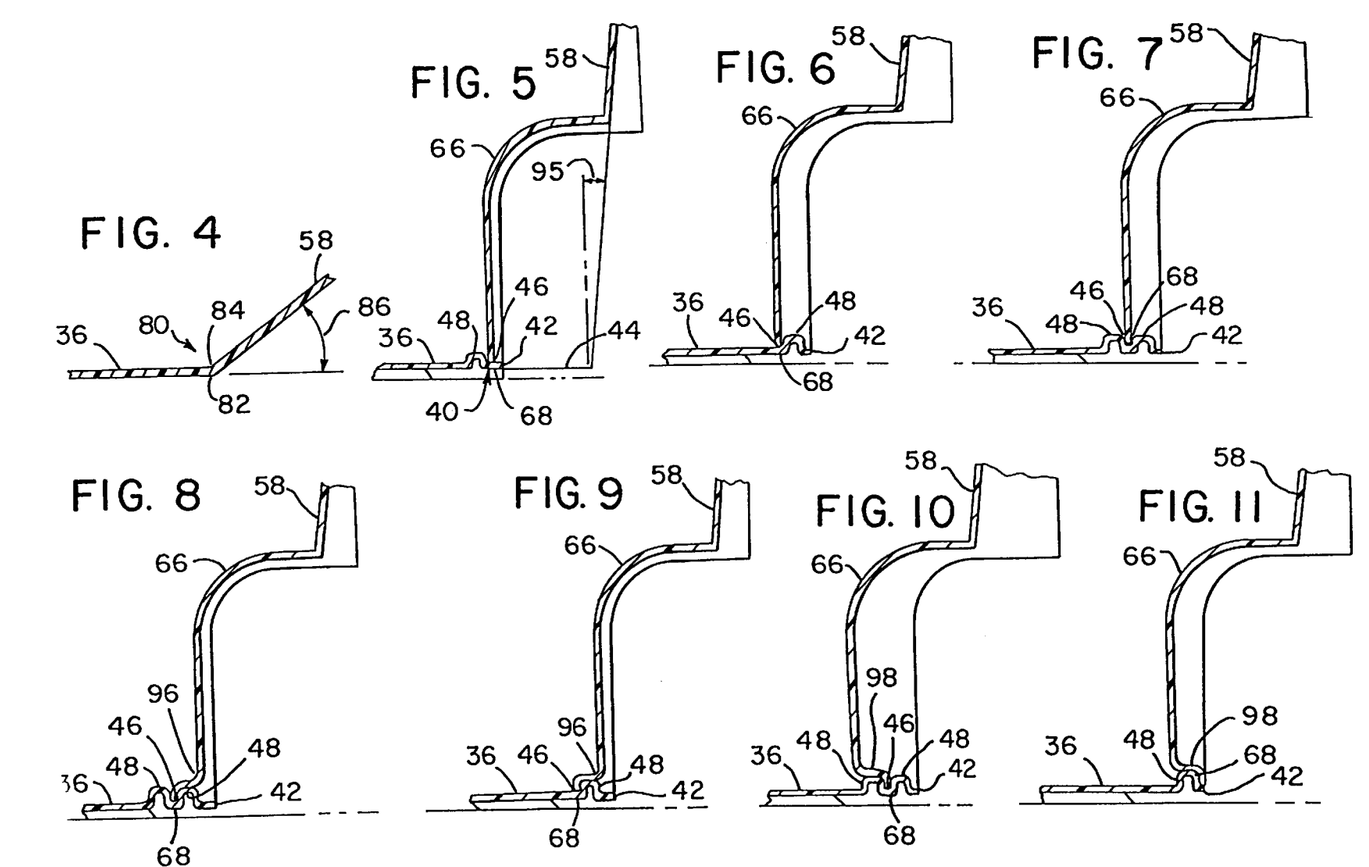
FIG. 4 is a cross-sectional view taken along line 4—4 in FIG. 3.
FIGS. 5–11 are cross-sectional views taken generally along line 5—5 in FIG. 3 and illustrate alternative designs for the wheelwell cover/bottom wall interface area.

Due to considerable draft employed in forming the bedliner 34, the side walls 58 are inclined outwardly to a significantly greater degree than are side walls in prior art molded plastic bedliners. Each of the side walls 58, when in its as-molded position, forms an angle with the horizontal bottom wall 36 that is indicated in FIGS. 2 and 4 with reference numeral 86. While angle 86 may vary depending on the desired configuration of the bedliner 34, in one embodiment the angle 86 is about 36 degrees, thus forming a complementary draft angle which is over four times (i.e., about 54 degrees) greater than prior art draft angles of 4–12 degrees.

When in an unfinished molded blank state, the bedliner 34 includes a pair of wedge-shaped blank or cutout sections 88 (only one is shown in FIG. 2) formed between the side edge portions 56 of the front wall 50 and the front edge portions 64 of the side walls 58. In the embodiment shown in the drawings the unfinished bedliner 34 is also formed with a pair of wheelwell cover blanks or cutout sections 90 (only one is shown in FIG. 2). The wheelwell cutout sections 90 are formed between the outer edges 42 of the bottom wall 36 and the lower edge and the lower edge portions 68 of the side walls 58. In finishing the bedliner 34 the cutout sections 88 and 90 are cut from the bedliner 34 to leave wedge-shaped gaps 92 (only one is shown) and gaps 94 (only one is shown) beneath the wheelwell covers 66. The removal of the cutout sections 88 and 90 permits the side walls 58 to be pivoted to more upright positions or installed positions (shown with respect to one of the side walls in FIGS. 1 and 3).

When the side walls 58 are folded inwardly to their installed positions the front edge portions 64 overlap and engage the side edge portions 56 of the front wall 50 to close the gaps 92, and the lower edge portions 68 of the wheelwell covers 66 seat on the seating surfaces 46 (FIG. 5) to close the gaps 94. This gives the bedliner 34 a finished, integrally molded appearance. If desired, mechanical means such as adhesives, fasteners or snap-together joints could be used to join the side walls 58 to the front wall 50 and the wheelwell covers 66 to the bottom wall 36. When the side walls 58 are in their installed nearly vertical positions they may be inclined at a desired angle (indicated by reference numeral 95 in FIG. 5) relative to the side walls 18. That angle 95 is typically from 4–12 degrees, and in the embodiment illustrated is about 5 degrees. Thus, while the range of pivotal movement can vary, as desired, in the illustrated arrangement the side walls 58 have a pivotal range of greater than 45 degrees.

Also, the amount of available space in the interior of the cargo bed 12 is not adversely affected by the large draft angles used to form the bedliner 34. In fact, interior cargo bed space may be increased by using the bedliner 34 since the side walls 58 can be positioned substantially vertically, if desired, to substantially eliminate any space between the bedliner side walls 58 and the cargo bed side walls 18. That space is inherent in cargo beds that are fitted with prior art bedliners having integrally molded side walls that are permanently inclined.

To install the bedliner 34 after it has been trimmed to remove the cutout sections 88 and 90, the cleats 28 are first preferably removed from the cargo bed 12. (If the base walls 76 of the pockets 74 are removed or slotted to accommodate the cleats 28 they need not be removed.) The bedliner side walls 58 are then folded upwardly so that the bedliner 34 can be fitted into the cargo bed 12 with the bottom wall 36, the front wall 50 and the side walls 58 of the bedliner 34 overlaying the horizontal floor 14, and the vertical front wall 16 and side walls 18 of the cargo bed 12, respectively. When the bedliner 34 is fitted into the cargo bed 12 the board restraint channels 70 fit into and are supported by the board restraint structures 24, board support pockets 72 fit into and are supported by the board support structures 26, and the pockets 74 fit into the recessed areas 30. The integrally molded pockets 74 replace holes in prior art bedliners and prevent water, debris, etc. from entering between the bedliner side walls 58 and the cargo bed side walls 18. If needed, the side walls 58 can be bent inwardly or folded beyond their installed to secure the bedliner 34 in the cargo bed 12.

Illustrated in FIGS. 6–11 are alternative designs for the interface between the bottom wall 36 and the wheelwell covers 66, and the same reference numerals are used to denote elements common to those embodiments. In particular, FIG. 6 illustrates a modified version of the bottom wall/wheelwell cover interface area shown in FIG. 5. In the arrangement shown in FIG. 6, the seating surface 46 is on the inside of the lip portion 48, instead of the outside as shown in FIG. 5. The lip portion 48 in both cases provides a dam to prevent the ingress of water or debris between the bedliner side wall 58 and the cargo bed side wall 18.

The arrangement illustrated in FIG. 7 combines features of the arrangements of FIGS. 5 and 6 and includes a spaced apart pair of lip portions 48. The seating surface 46 is positioned between the lip portions 48.

In FIGS. 8 and 9, the wheelwell cover 66 is provided with an inwardly extending rolled over portion 96 that terminates at the lower edge portion 68. In FIG. 8 the bottom wall 36 is provided with double lip portions 48 (similar to FIG. 7), and in FIG. 9, the rolled over portion 96 seats on top of the single lip portion 48.

In FIGS. 10 and 11, the wheelwell cover 66 is provided with an outwardly extending rolled over portion 98 that terminates at the lower edge portion 68. In FIG. 10 the bottom wall 36 is provided with double lip portions 48 (similar to FIGS. 7 and 8), and in FIG. 11 the rolled over portion 98 seats on top of the single lip portion 48.

Advantageously, the foldable side walls 58 of the bedliner 34 facilitate the use of large draft angles during its formation to improve molding and demolding procedures and bedliner nestability. By using increased draft, bedliner features, such as the recessed access pockets 74, can also be more easily incorporated into the bedliner 34, and improved draw conditions facilitate the use of reduced thickness thermoplastic sheet material to form the bedliner 34. This is all accomplished without adversely affecting available interior cargo space in a cargo bed equipped with the bedliner 34.

Figures 12, 18, 19:
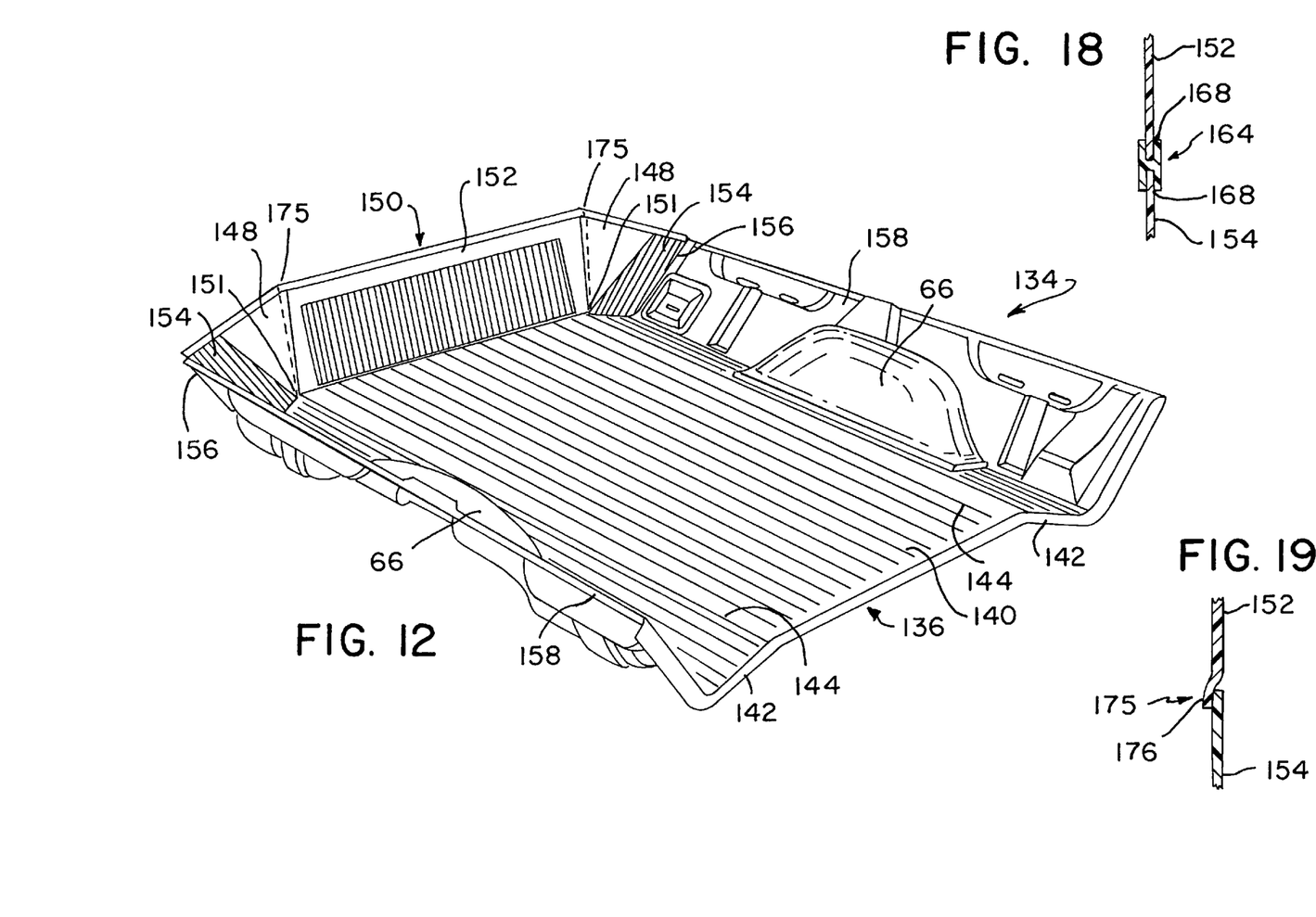
FIG. 12 is a perspective view of a pick-up truck bedliner having a folding bottom wall with a central portion and a pair of side portions, the bedliner being shown in the as-molded position.
FIG. 18 is a cross-sectional view of an H-shaped joint connector for connecting front wall segments after the wedge-shaped cut-away portions have been removed.
FIG. 19 is a cross-sectional view of a splice portion of a front wall in accordance with the present invention.
Figure 13:
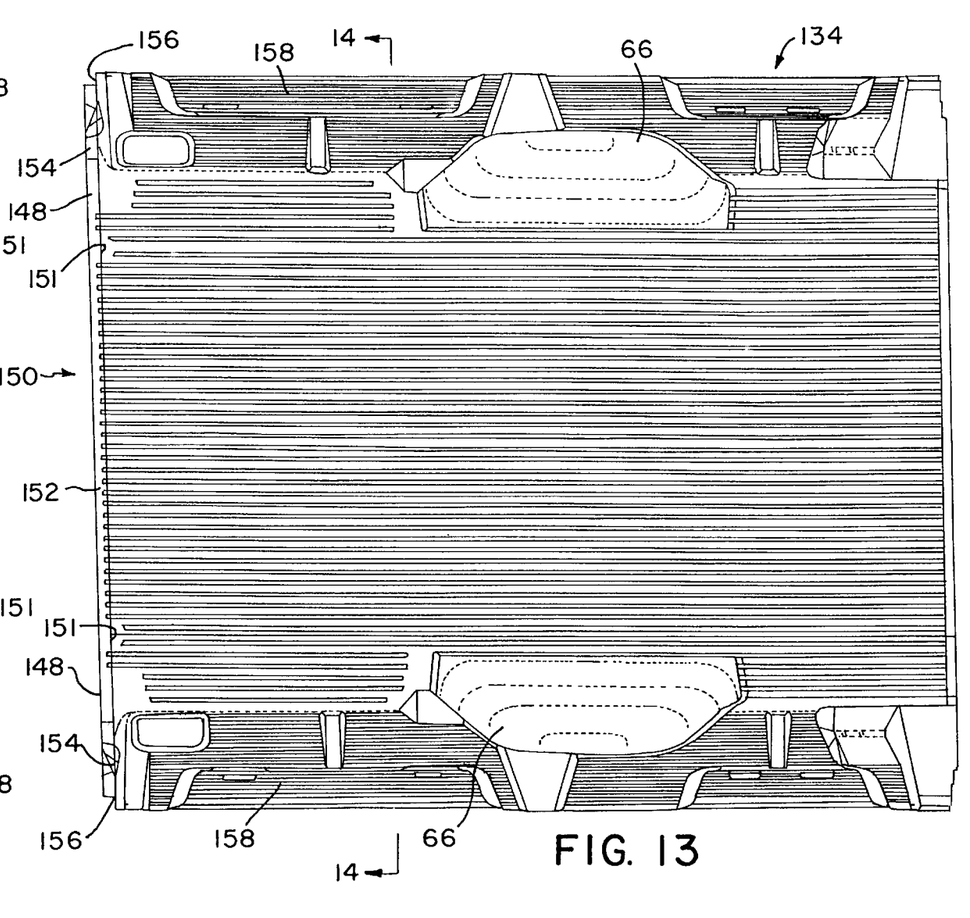
FIG. 13 is a plan view of the bedliner of FIG. 12 in the as-molded position.
Figure 14:
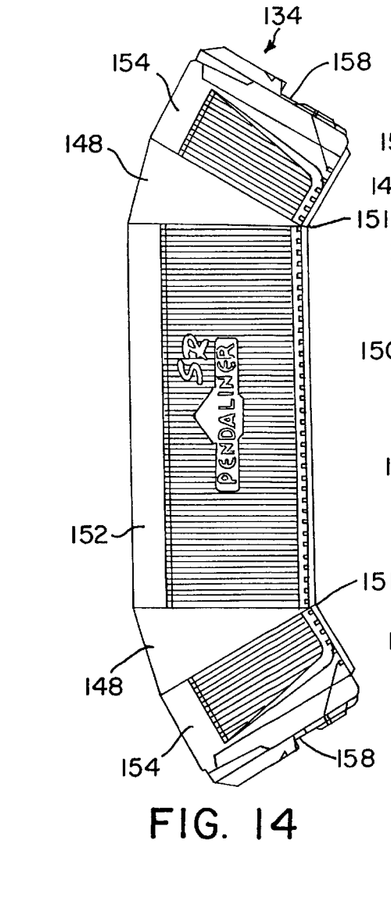
FIG. 14 is a cross-section of the bedliner taken along line 14—14 of FIG. 12.

Another cargo bedliner 134 is depicted in FIGS. 12 to 14 and it includes a bottom wall 136 that is foldable to achieve additional goals over the bedliners described above. In this embodiment, the bottom wall 136, as opposed to the sidewalls, folds so that there need not be any cut-out sections 88 in the corners or gaps 92 on the lower edge of the wheel well covers 66 that might permit water to leak under the bedliner. To avoid weak corners in the bedliner and gaps near the wheel well covers, the bedliner 134 has a bottom wall 136 with a central portion 140 and two side portions 142. The two side portions 142 are molded integrally to the central portion 140 along junction lines 144 and, in the as-molded position, the side walls 158 extend upwardly and outwardly and the side portions 142 extend downwardly and outwardly from the central portion at any angle that will give the benefits described above in relation to easy removal of a complex molded unitary thermoformed bedliner with numerous pockets, ribs, and other shapes from a thermoforming mold. In addition, by folding the bottom wall 136 along junction lines 144 that are spaced away from the bedliner corners, the bedliner corners can be unitary for increased strength and the wheel well covers 66 can be formed integrally with both the bedliner bottom wall 136 and the bedliner sidewalls 58. This construction avoids having joints formed between the wheel well covers 66 and adjacent components. The benefits of this embodiment are realized by spacing the junction lines inwardly from the corners and preferably inwardly from the wheel well covers.

In this embodiment, cut-out sections 148 must be formed in the front wall 150 to accommodate conversion of the bedliner unit 134 from the as-molded position to a use or an installed position. The cut-out sections 148 are generally triangular or wedge-shaped and have a lower corners 151 positioned adjacent to the junction lines 144 between the bottom wall central portion 140 and each of the two side portions 142. With this arrangement of cut-out sections 148 in the front wall 150, the front wall is divided into three sections; a central section 152 and two outwardly and downwardly extending side sections 154. The central section 152 is molded integrally with the bottom wall central portion 140. The side sections 154 are molded integrally to the bottom wall side portions 142 and the bedliner sidewalls 158 to form strong bedliner corners 156. To obtain the benefits of this embodiment, the cut-out sections 148 are spaced inward from the bedliner corners 156 to maintain corner strength and can be any shape that permits the bottom wall to bend and accommodate easy forming and nesting.

Thus, the bedliner 134 is molded in the position illustrated with the bedliner bottom wall central portion 140 disposed at an angle relative to the bottom wall side portions 138, and the front wall is formed in three sections spaced apart by cut-out sections 148. The bottom wall 136 is molded integrally with the side walls 158 and wheel well covers 66, and the front wall side sections 154 are molded integrally with the sidewalls 158 to form the corners 156. After being removed from the mold, the bedliner cut-out sections 148 are removed from the front wall 150 and the bedliner bottom wall 136 is bent to a generally planar shape. Typically, the bedliner material is such that the bottom wall central portion 140 and side portions 142 can be bent relative to one another without any special joints being formed in the bottom wall 136. Nonetheless, it is possible to form wedge-shaped hinge portions (as illustrated in FIG. 4) along the junction lines 144 between the bottom wall central portion 140 and side portions 142 for easier conversion from the as-molded position to the installed position.

Once the bedliner 134 has been folded into the use or installed position, the front wall central section 152 can be connected to the front wall side sections 154 using any appropriate joint connector 164. Preferably, the joint connector 164 (FIG. 18) is H-shaped in cross-section to define a pair of opposing recesses 168 for receiving adjacent front wall sections in a snug or snap fit. A tight fit is preferable to reduce or eliminate water seepage through the joint on front wall 150. However, a snug fit is typically unnecessary to hold the front wall sections together because the bedliner 134 will be restrained from drastic lateral movement by the pickup truck cargo bed. Although depicted as an under-the-rail bedliner, the bedliner 134 can include outwardly extending top rails to fit over side rails on a pickup truck cargo bed.

Figure 15:
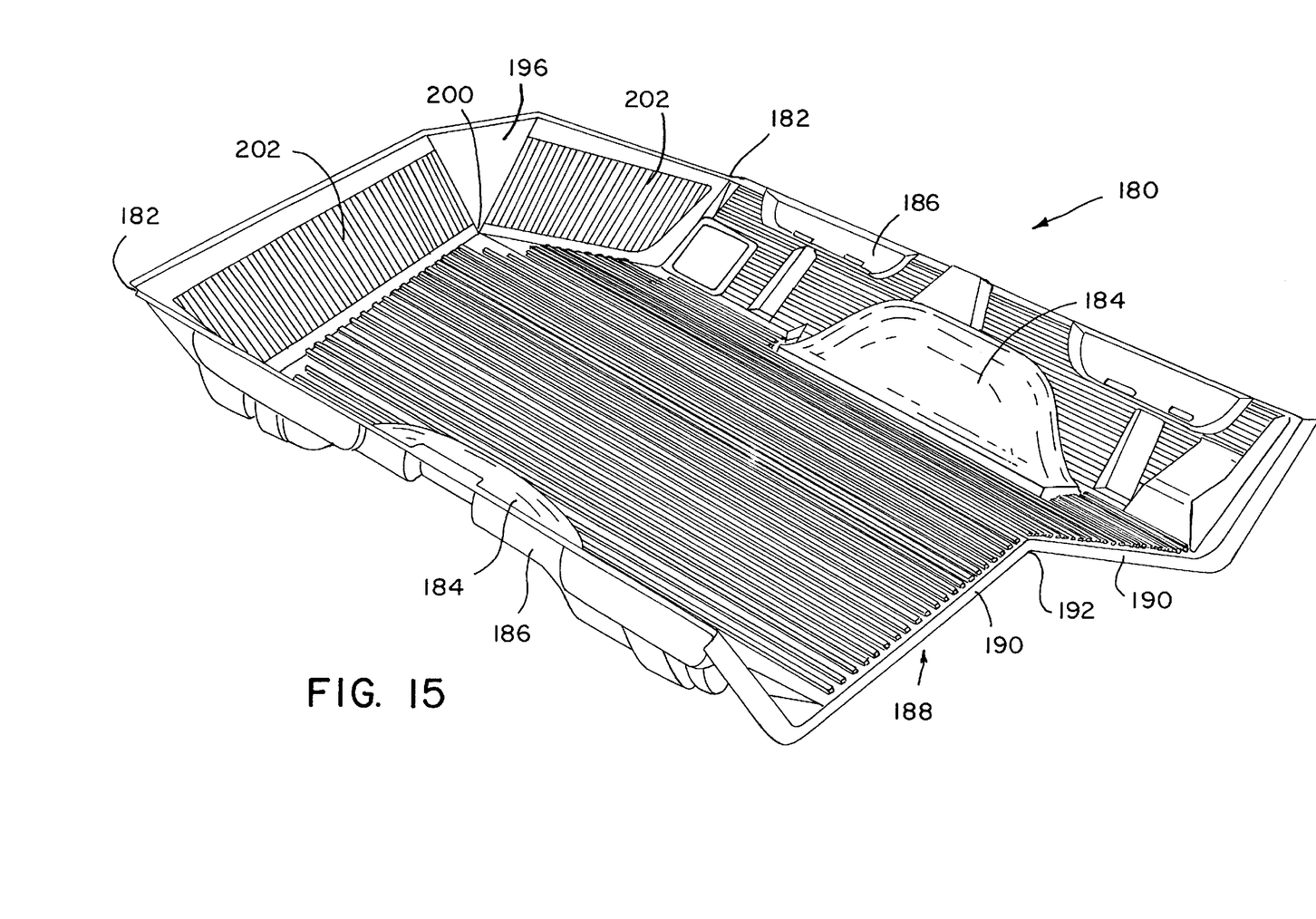
FIG. 15 is a perspective view of a bedliner having a folding bottom wall with a pair of side portions arranged in a non-planar position in the as-molded position.
Figure 16:
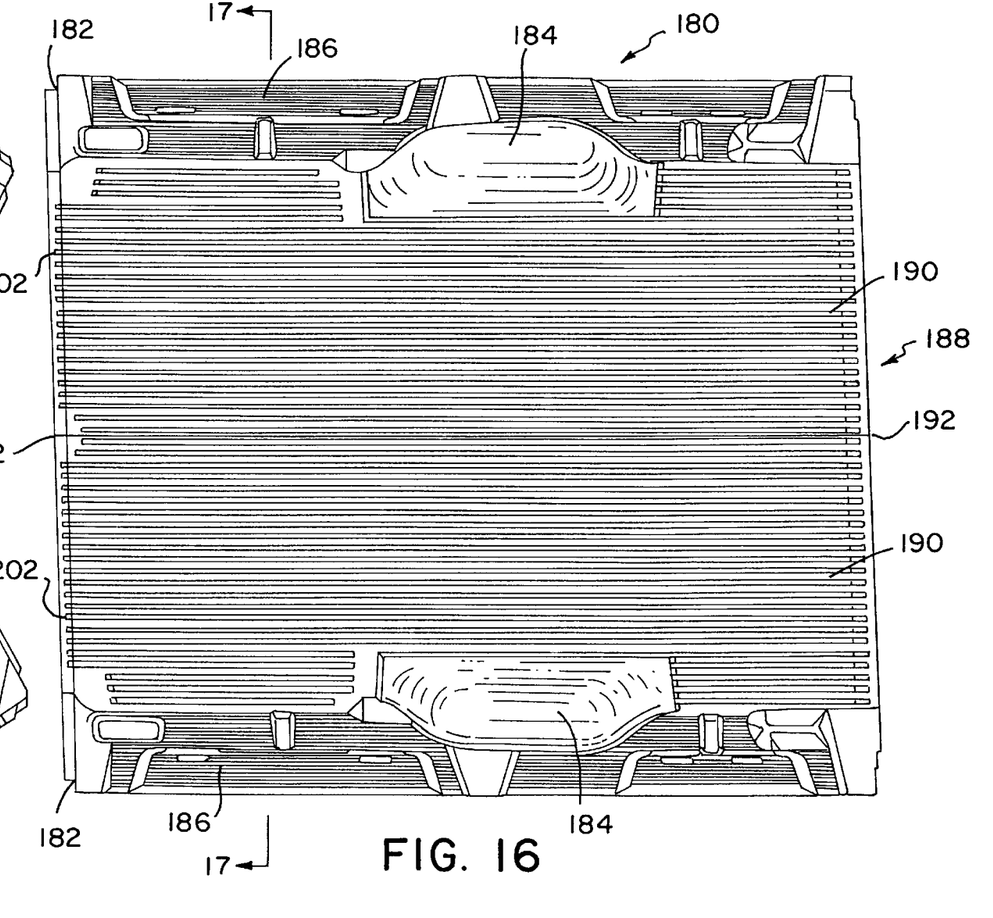
FIG. 16 is a plan view of the bedliner of FIG. 15 in the as-molded position.
Figure 17:
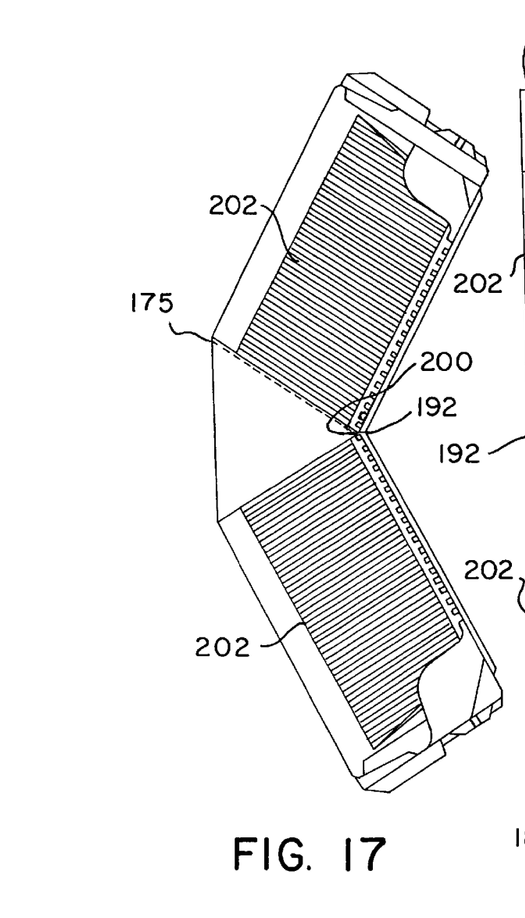
FIG. 17 is a cross-section of the bedliner taken along line 17—17 of FIG. 15.

Another bedliner 180 is depicted in FIGS. 15 to 17 which includes the beneficial attributes of the bedliner 134 depicted in FIGS. 12 to 14 in that the bedliner 180 includes integrally formed corners 182 and wheel well covers 184 that are formed integrally with opposing sidewalls 186 and a bottom wall 188. In this embodiment, the bedliner 180 bottom wall 188 includes two bottom wall side portions 190 integrally molded together in a non-planar position to obtain the molding benefits described above. The bottom wall side portions 190 are joined along a junction 192 that can, but preferably does not, include a hinge portion to aid in bending the bedliner 180 from an as-molded position to a use or an installed position. Although depicted along the longitudinal center line of the bedliner 180, the junction 192 can be at any location between the wheel well covers 184 to obtain the benefits of improved corner strength and integral wheel well covers.

A generally triangular or wedge-shaped cut-out section 196 is included in the bedliner front wall 198 with a lower corner 200 disposed adjacent to the junction 192 between the bottom wall side portions 190. The cut-out section 196 can be any shape that divides the front wall 198 into two front wall side sections 202 that are each molded integrally with corresponding bottom wall side portions 190 and to the sidewalls 186. With this arrangement, the bedliner 180 is converted from the as-molded position to the use position by removing the cut-out section 196 and bending the bedliner 180 to close the gap formed by the removed cut-out section 196 and bring the in front wall sections 202 together, and to bend the bottom wall side portions 190 into a generally co-planar position. A suitable joint connector 164 such as the one depicted in FIG. 18 can be used to connect the front wall sections 202 for rigidity and water tightness. The bedliner can include outwardly extending side rails to be used as an over-the-rail type bedliner.

FIG. 19 illustrates an embodiment where front wall portions are overlapped at a splice portion 175 to avoid the necessity of using a joint connector. In this embodiment the cut-away section is smaller than necessary to bring adjacent front wall segments together, which results in an overlapped splice portion 175. The splice portion 175 can include a lip 176 that is offset to permit adjacent front wall portions to be spliced in a co-planar position, as illustrated. The splice portion 175 may be lapped as illustrated, and then optionally glued, mechanically fastened, or otherwise secured to prevent adjacent front wall portions from pulling apart.

Various features of the invention are set forth in the following claims.

What is claimed is:

1. A molded thermoplastic bedliner for installation within the cargo bed of a pickup truck, the bedliner comprising:
   a bottom wall having a horizontal central portion, with a pair of bottom wall side portions integrally molded to the central portion, a bottom wall side portion extending downwardly and outwardly on opposite sides of the central portion, each bottom wall side portion extending along a junction line defined between the bottom wall central portion and the adjacent bottom wall side portion;
   opposite side walls, each side wall integrally molded to and extending upwardly and outwardly from a corresponding side portion of the bottom wall and having a front edge portion;
   a front wall having a central section which extends upwardly from the bottom wall central portion, and two side sections, each side section extending upwardly from a bottom wall side portion and having opposite side edge portions, each front wall side section side edge portion being molded integrally to a side wall front edge portion to form a corner, wherein a wedge shaped gap is defined between each front wall side section and the front wall central section, the gap extending from a junction line, and widening as it extends upwardly therefrom.

2. The bedliner of claim 1, wherein the bottom wall side portions are each joined to the bottom wall central portion by a hinge portion.

3. The bedliner of claim 1, wherein each sidewall includes molded structural configurations.

4. The bedliner of claim 1 further comprising a joint connector for connecting the front wall side sections to the front wall central section.

5. The bedliner of claim 4, wherein the joint connector is substantially H-shaped in cross-section.

6. The bedliner of claim 1, wherein the bedliner is an under-the-rail type cargo bed liner.

7. The bedliner of claim 1, wherein the front wall further comprises:
   a splice portion disposed adjacent one of said wedge shaped gaps and extending along one of the front wall side sections, the splice portion for overlapping with the front wall central section.

8. The bedliner of claim 7, wherein the splice portion further comprises a lip for splicing the front wall side section to the front wall central section in a co-planar relationship.

9. A bedliner molded blank of unitary vacuum formed thermoplastic material, the molded blank upon being trimmed forming a bedliner for use in a cargo bed of a pickup truck, the molded blank comprising:
   a bottom wall having a pair of side portions, each side portion extending form the bottom wall along a rearwardly extending junction line, and each bottom wall side portion extending downwardly and outwardly form said junction line;
   opposite side walls, each side wall integrally molded with a corresponding side portion of the bottom wall, and having a front edge portion; and a front wall having two opposite side sections, each front wall side section being molded integrally to a side wall front edge portion to form a corner, and extending upwardly form an adjacent one of said pair of bottom wall side portions; and two wedge shaped integrally molded cut-away sections, each of said wedge shaped sections being positioned inwardly from one of said two front wall side sections, each cut-away section extending upwardly from and of increasing width as it extends from the junction line from which said adjacent one of said bottom wall portions extends.

10. The bedliner of claim 9, wherein each junction line is defined by hinge portions.

11. The bedliner of claim 9, wherein each sidewall includes molded structural configurations.

12. The bedliner of claim 9, wherein each cut-away section includes a lower corner disposed adjacent to the junction line.

13. The bedliner of claim 9, wherein the bedliner is an under-the-rail type cargo bed liner.

14. The bedliner of claim 9, wherein the front wall further comprises:

a splice portion disposed adjacent at least one cut-away section, the splice portion for overlapping with a front wall portion when the cut-away section is removed and the bedliner bottom wall is folded flat.

15. The bedliner of claim 14, wherein each splice portion includes a lip for splicing the front wall portions in a co-planar relationship.

16. A stack of nested bedliners of unitary vacuum formed thermoplastic material for use in a cargo bed of a pickup truck, the stack of nested bedliners comprising:

a first bedliner having a bottom wall having a central portion and a pair of side portions, each side portion extending from the bottom wall central portion along a rearwardly extending junction line, and each bottom wall side portion extending downwardly and outwardly from the bottom wall central portion; opposite side walls, each side wall integrally molded to a corresponding side portion of the bottom wall; a wheel well cover integrally molded to each side wall and to the corresponding side portion of the bottom wall; and a front wall having two side sections, a front wall side section being integrally with one of the bottom wall side portions and one of said side walls; and a second bedliner having a bottom wall having a central portion positioned above and nested upon the first bedliner bottom wall central portion, the second bedliner also having bottom wall side portions which extend downwardly and outwardly from the second bedliner bottom wall central portion, the second bedliner bottom wall side portions thereby being positioned above and nested upon the first bedliner bottom wall side portions.

17. The bedliner of claim 16, wherein the first bedliner bottom wall side portions are joined to the first bedliner bottom wall central portion by hinge portions.

18. The bedliner of claim 16, wherein each side wall includes molded structural configurations.

19. The bedliner of claim 16, wherein the bottom wall side portions are foldable to a co-planar position.

20. The bedliner of claim 16, wherein each bedliner front wall central portion has a lip portion molded integrally therewith, the lip portion for overlapping with the opposite side edge portion when the bedliner bottom wall side sections are folded to a co-planar position.

21. A method for making a bedliner to be used in the cargo bed of a pick-up truck, said method comprising the steps of:

thermoforming a sheet of thermoplastic material into an unfinished integrally molded bedliner having a bottom wall, a front wall, opposite walls each joined to the bottom wall along a fold line, each of the side walls being positioned in an as molded position, and a pair of front wall cutouts each extending between segments of the front wall, the front cutouts preventing the side walls from being pivoted about the fold lines to installed positions, and removing the front cutouts to fold the bottom wall flat;

wherein the front cutouts are wedge-shaped and are removed by being cut from the front wall to form wedge-shaped gaps therebetween.

22. A method for making a bedliner to be used in the cargo bed of a pick-up truck, said method comprising the steps of:

thermoforming a sheet of thermoplastic material into an unfinished integrally molded bedliner having a bottom wall, a front wall, opposite walls each joined to the bottom wall along a fold line, each of the side walls being positioned in an as molded position, and a pair of front wall cutouts each extending between segments of the front wall, the front cutouts preventing the side walls from being pivoted about the fold lines to installed positions, and removing the front cutouts to fold the bottom wall flat, wherein each of the side walls of the unfinished bedliner includes a wheelwell cover, and a wheelwell cover cutout extending between a lower edge portion of the wheelwell cover and the bottom wall, each of the wheelwell cover cutouts preventing one of the side walls from being pivoted about its fold line to its installed position, and wherein the method for making the bedliner includes the step of removing the wheelwell cover cutouts from between the bottom wall and the side walls so that the side walls are pivotable relative to the bottom wall from the as molded positions to the installed positions.

23. A method for making a bed liner as set forth in claim 22 wherein the removal of the front cutouts leaves spaces between the front wall segments, and the removal of the wheelwell cover cutouts leaves spaces between the lower edge portions of the wheelwell covers and the bottom wall, and wherein all of the spaces are closed when the side walls are pivoted upwardly from their as-molded positions to their installed positions.

24. A molded thermoplastic bedliner for installation within the cargo bed of a pickup truck, the bedliner comprising:

a bottom wall having a pair of bottom wall side portions connected together along a rearwardly extending junction line, each bottom wall side portion extending downwardly and outwardly on opposite sides of the junction line;

opposite side walls, each side wall integrally molded to and extending upwardly and outwardly from a corresponding side portion of the bottom wall and having a front edge portion;

a front wall having two side sections, each side section extending upwardly from a bottom wall side portion and having opposite side edge portions, each front wall side section being molded integrally to a sidewall to form a corner, wherein a wedge shaped gap is defined between the two front wall side sections, the gap extending from the junction line, and widening as it extends upwardly therefrom.

25. A bedliner molded blank of unitary vacuum formed thermoplastic material, the molded blank upon being trimmed forming a bedliner for use in a cargo bed of a pickup truck, the molded blank comprising:

a bottom wall having a pair of side portions, each side portion extending from the other bottom wall side portion along a rearwardly extending junction line, and each bottom wall side portion extending downwardly and outwardly from said junction line;

opposite side walls, each side wall integrally molded with a corresponding side portion of the bottom wall, and having a front edge portion; and a front wall having two opposite side sections, each front wall side section being molded integrally to a side wall front edge portion to form a corner, and extending upwardly from an adjacent one of said pair of bottom wall side portions; and a wedge shaped integrally molded cut-away section positioned between said two front wall side sections and extending upwardly from and of increasing width as it extends from the junction line.

* * * * *